United States Patent
Elsegood

(10) Patent No.: US 6,846,411 B2
(45) Date of Patent: Jan. 25, 2005

(54) MAGNETIC FLUID FILTER ADAPTER

(75) Inventor: Stewart D. Elsegood, Balmoral Beach (AU)

(73) Assignee: Boss Components (Australia) Pty Ltd, Sydney (AU)

(*) Notice: Subject to any disclaimer, the term of this patent is extended or adjusted under 35 U.S.C. 154(b) by 34 days.

(21) Appl. No.: 10/032,215

(22) Filed: Dec. 21, 2001

(65) Prior Publication Data

US 2003/0116493 A1 Jun. 26, 2003

(51) Int. Cl.[7] .............................................. B01D 35/06
(52) U.S. Cl. ...................... 210/222; 210/223; 210/261; 210/438; 210/450; 29/469
(58) Field of Search ................................ 210/222, 223, 210/DIG. 17, 261, 438, 450, 695; 123/196 A; 184/6.25; 29/896.62, 428, 469

(56) References Cited

U.S. PATENT DOCUMENTS

| | | | | |
|---|---|---|---|---|
| 2,886,176 A | * | 5/1959 | Paton | 210/223 |
| 4,014,794 A | * | 3/1977 | Lewis | 210/199 |
| 4,237,015 A | * | 12/1980 | Fearnhead | 210/444 |
| 4,613,435 A | | 9/1986 | Shoemaker | |
| 4,642,183 A | | 2/1987 | Hebert | |
| 5,817,233 A | | 10/1998 | Cooper | |
| 6,004,459 A | | 12/1999 | Caiozza | |
| 6,349,693 B1 | * | 2/2002 | Reinosa | 123/196 A |
| 6,444,123 B1 | | 9/2002 | Caiozza | |

FOREIGN PATENT DOCUMENTS

| | | | | |
|---|---|---|---|---|
| EP | 1 076 601 B1 | | 8/2002 | |
| WO | WO 92/05346 | * | 4/1992 | F01M/11/03 |
| WO | WO 97/26448 | | 7/1997 | |

OTHER PUBLICATIONS

Translation of WO 97–26448.*

* cited by examiner

*Primary Examiner*—Matthew O. Savage
(74) *Attorney, Agent, or Firm*—Knobbe, Martens Olson & Bear LLP

(57) ABSTRACT

A filter adapter for removing metallic particles from fluid. The adapter is cylindrical in shape and includes an attachment insert for mounting the adapter between a source in a fluid flow system and a conventional filter. The adapter has a ring shaped magnet held in the housing of the adapter by magnet holders. The adapter has a plurality of perforations in the top and bottom for the flow of unfiltered fluid from the fluid source, through the adapter, and to the conventional filter. The attachment insert is hollow so as to allow filtered oil to flow back from the conventional filter to the fluid system the adapter is attached to.

25 Claims, 5 Drawing Sheets

MAGNETIC FLUID FILTER ADAPTER

BACKGROUND OF THE INVENTION

1. Field of the Invention

The present invention relates to devices for filtering liquids, and more particularly a magnetic filter adapter for removing solid particles from a fluid.

2. Description of the Related Art

Fluid flow systems typically use canister-shaped spin on filters to remove foreign particles from the fluid used to lubricate or cool the moving parts of a mechanical system, such as an engine. Traditional filters typically rely upon a filtration method of removing particles by passing the fluid through a porous material that captures large impurities in the fluid. Many particles, however, are subject to magnetic attraction, such as metal shavings in automobile engine oil from worn engine parts, which are smaller than the openings in the porous material used in a conventional oil filter. Therefore many of the metallic particles in engine oil are not removed by the oil filter and continue to circulate through the engine system causing wear and possible blockages in the system. In addition to unfiltered particles, trapped particles also have a tendency to break loose and travel back into the system causing further damage.

Some current oil filters include an assembly of magnets applied to the outer wall of an oil filter cartridge in order to magnetically capture some of the metal shavings from engine parts. Some of these magnetic assemblies are permanently attached to the filter cartridge, whereas others can be removed upon replacement of the filter. One example of a magnetic assembly for oil filters is disclosed by Cooper in U.S. Pat. No. 5,817,233 entitled "Magnetic Filtering Apparatus." Cooper's filter apparatus consists of a magnetic member, which surrounds a replaceable oil filter. The magnetic member attracts the metal particles to the sidewall of the filter, thereby removing some of the particles from the main flow direction of the oil through the filter. However, because Cooper's magnetic member is mounted outside of the filter, it does not efficiently remove the metal particles.

Another oil filter with an external magnetic assembly is disclosed by Shoemaker in U.S. Pat. No. 4,613,435 entitled "Magnetic Oil Filter." Shoemaker's apparatus includes a magnetic plate mounted within the disposable oil filter. Unfortunately, this type of filter is more costly than a conventional oil filter because both the oil filter and magnetic plate need to be replaced once the oil filter has passed its useful lifespan.

It will be appreciated that the use of a removable magnetic filter assembly, auxiliary to a replaceable spin on filter cartridge, would be beneficial in a fluid filtration system. Accordingly, what is needed in the art is an inexpensive and flexible filter system that includes a magnetic filtering capability. The present invention provides such a device.

SUMMARY OF THE INVENTION

A magnetic filter adapter for removing magnetically attractable particles from a fluid comprises an adapter body having a perforated upper portion and a perforated lower portion, a centrally located opening passing through the upper portion and the lower portion, a hollow insert mounted inside the opening and providing a first threaded portion adapted to engage a threaded stud and a second threaded portion adapted to mount to a filter, and a magnet disposed within the adapter body for removing metallic particles from the fluid.

The magnet can be in the shape of a ring, and the adapter can further comprise a ring support for mounting the magnet to the adapter body such that a gap exists between the magnet and the upper portion. The upper portion can have at least one sealing gasket, and a circular pattern of perforations. The perforated lower portion can also have a circular pattern of perforations. The fluid can be oil, transmission fluid, or hydraulic fluid.

An adapter for removing metallic particles from a fluid comprises a cylindrical adapter body comprising a perforated upper portion and a perforated lower portion, a centrally located opening passing through the upper portion and the lower portion, a hollow insert mounted inside the opening and providing a first connection means adapted to engage a connection means on a fluid source and a second connection means adapted to mount to a filter, and a magnet disposed within the adapter body for removing metallic particles from the fluid.

A method of assembly of an adapter for removing metallic particles from a fluid comprises inserting a magnet in a perforated, lower portion of a housing of the adapter, enclosing the magnet in the adapter by attaching a perforated upper portion of a housing of the adapter to the perforated lower portion, and inserting a hollow insert in a centrally located opening passing through said upper portion, said lower portion, and said magnet.

The method of assembly may further comprise attaching a sealing gasket to the upper portion, and, before inserting said magnet in the perforated upper portion, mounting the magnet to a ring support and then inserting the ring support along with the magnet in the lower portion of the adapter.

BRIEF DESCRIPTION OF THE DRAWINGS

The present invention is described with reference to the accompanying drawings. In the drawings, like reference numbers indicate like elements.

DETAILED DESCRIPTION OF THE PREFERRED EMBODIMENT

Figure 1:
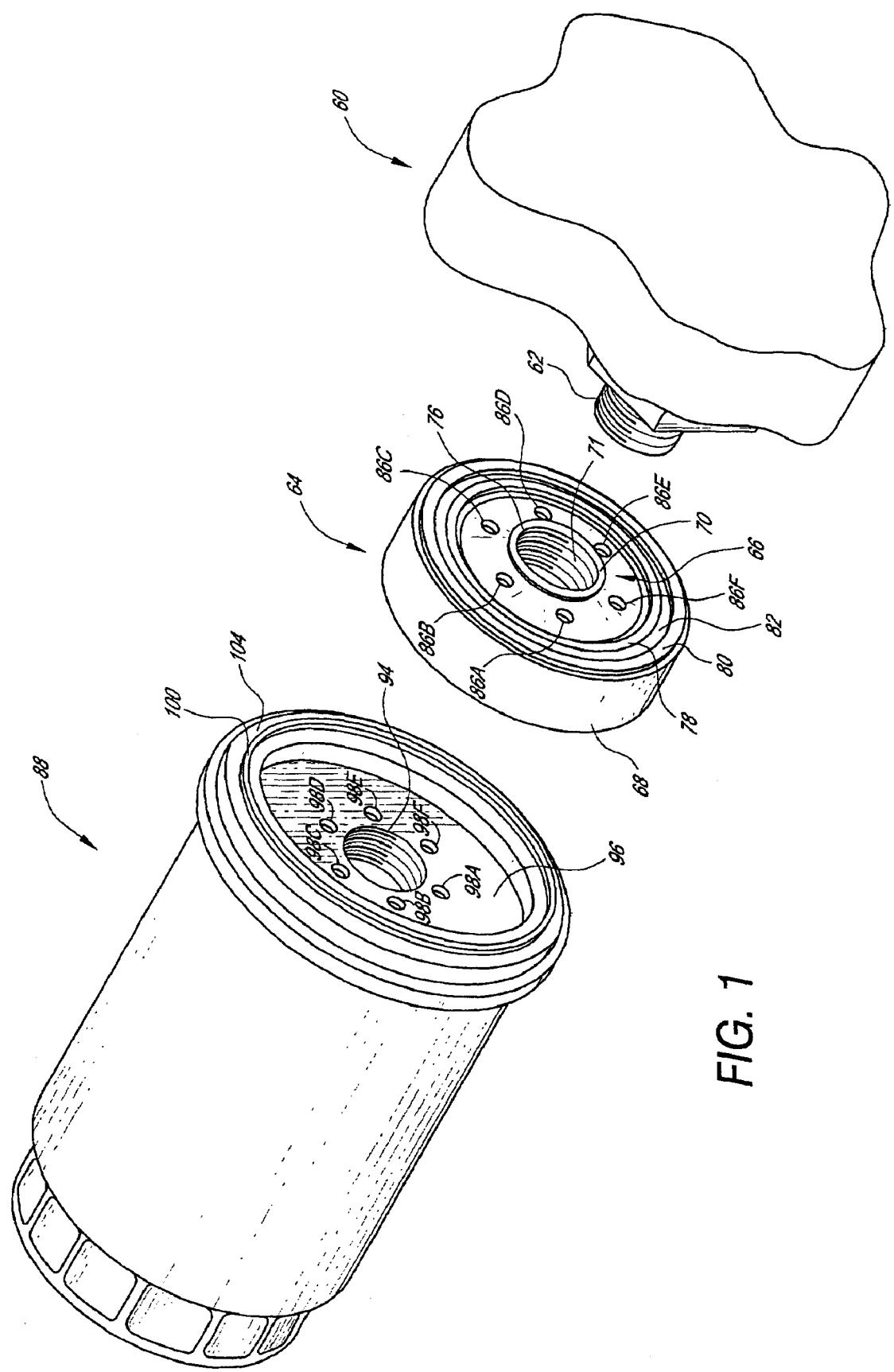
FIG. 1 is a perspective view illustrating the assembly of a magnetic filter adapter and oil filter cartridge to the body of a motor vehicle.

Embodiments of the invention relate to a magnetic fluid filter adapter that is designed to mount between a conventional spin on filter and its normal mating partner. Thus, in one embodiment, the magnetic fluid filter adapter is an oil filter adapter that includes a magnet for filtering magnetically attractable particles from automobile engine oil. The magnetic filter adapter is generally cylindrical in shape and in one embodiment has a diameter similar to that of a conventional oil filter. This embodiment of a magnetic adapter is installed in an automobile engine oil filtration system between an engine block and a conventional oil filter. Additional embodiments of the invention can be incorporated with a plurality of spin on fluid filters in fluid flow lines. Additional applications for the filter include transmission fluid and hydraulic systems. In addition, it should be realized that the term "spin on" is not limited to any particular mechanism for attaching a filter to its mate. For example, a spin on filter includes filters that attach through non-threaded mechanisms that require a ¼, ½, or ¾ turn to reversibly mount to a mate.

The magnetic filter adapter is flexible in that it can mount to various automobile engines or fluid lines and various filters. In order to provide this flexibility, the adapter mounts to the fluid source line and filter by way of a threaded insert. Thus, disposed within a central opening of the adapter is a receptacle for receiving any one of a plurality of attachment inserts. Each attachment insert is hollow and allows the magnetic filter adapter to be attached on one end to a plurality of different fluid sources, such as automobile engines, transmission lines and any other device that would benefit from magnetic filtration. The magnetic filter adapter also provides an opening configured to attach to a filter, thus placing the adapter between the fluid source and the fluid filter. This will be discussed in more detail with reference to the figures below.

Within the magnetic filter adapter is a magnet, preferably in the shape of a ring, that is held in place by a plurality of support pieces mounted inside the housing of the adapter. Metal particles that are flowing within the unfiltered fluid are attracted to and held by the magnet as the fluid flows over and through the adapter. Of course, it is not necessary for the magnet to be ring shaped, and other shapes of a magnet, or magnets, or other magnetic type of apparatus integrated with an adapter or filter are contemplated within the scope of the invention.

The top and bottom of the adapter housing each have a plurality of holes through which fluid flows into and out of the adapter. The holes in the top of the adapter permit flow to similar holes in the fluid source, and the holes in the bottom of the adapter allow flow to similar holes in the top of the filter. Unfiltered fluid flows from the engine block into the adapter through the holes in the top of the adapter, over and through the magnetic field of the magnet, and out of the adapter through the holes in the bottom of the adapter into the conventional filter. The fluid then undergoes a filtration process in the conventional filter, and proceeds to flow out of the conventional filter, through the hollow attachment insert in the magnetic filter adapter, and back to the fluid system.

Referring initially to FIG. 1, a portion of an engine block 60 of a motor vehicle is illustrated having an outwardly extending threaded stud 62. A generally cylindrical magnetic adapter 64 is shown having a disk shaped upper portion 65 and a lower portion 68 which form a chamber. As will be understood with reference to the exploded view of FIG. 5, the upper portion 66 fits within the lower portion 68. The upper and lower portions 66, 68 have centrally located openings such that an attachment insert 70 can be slidably inserted through the center of both portions 66, 68 and the chamber. It should also be understood that the upper portion 66 and lower portion 68 are perforated so that oil can pass from the engine, through the chamber in the adapter 64, and into the filter 88.

In FIG. 1 the attachment insert 70 is installed by slidably engaging it through a central opening 76 of the magnetic adapter 64. The attachment insert 70 has a threaded interior 71, which allows the magnetic adapter 64 to be screw mounted to the threaded stud 62 of the engine block 60. In addition, the attachment insert 70 has a threaded exterior (not shown) for attachment to a conventional oil filter 88. This is discussed in more detail with reference to FIG. 2 below.

The attachment insert 70 can be replaced or modified in order for the magnetic adapter to mount with any type of threaded stud 62. In addition, the attachment insert 70 can be designed to attach with any type of oil filter 88.

To provide a liquid tight seal between the engine block 60 and the upper surface 66, the upper surface 66 includes a circular inner sealing gasket 78 and a circular outer sealing gasket 80. These gaskets are designed to cooperate with sealing surfaces on conventional engines or various types of apparatus with which the magnetic adapter 64 can be used. The sealing gaskets 78, 80 are held in place by a seal carrier 82, which attaches to the upper portion 66 of the magnetic adapter 64. Of course, the invention is not limited to a particular configuration of sealing gaskets. Any number of sealing gaskets in any shape or geometry can be used depending on the level of reliability desired by the user and the application environment of the magnetic adapter 64.

Traversing through the upper portion 66 of the magnetic adapter 64 are a plurality of perforations 86A–F. The perforations 86A–F allow oil to flow from openings (not shown) on a lower surface of the engine block 60 into the interior of the magnetic adapter. As shown, these perforations are preferably in a circular pattern.

The oil filter cartridge 88 is shown having a centrally located threaded opening 94 adapted to receive an external threaded portion of attachment insert 70. Located on an upper surface 96 of the oil filter cartridge 88 are a plurality of apertures 98A–F whereby oil flows through from apertures 86A–F in the magnetic adapter 64. A sealing gasket 100 is mounted on an end wall 104 of the oil filter cartridge 88 for cooperation with a lower sealing surface (not shown) on the lower portion 68 of the magnetic filter 64.

Figure 2:
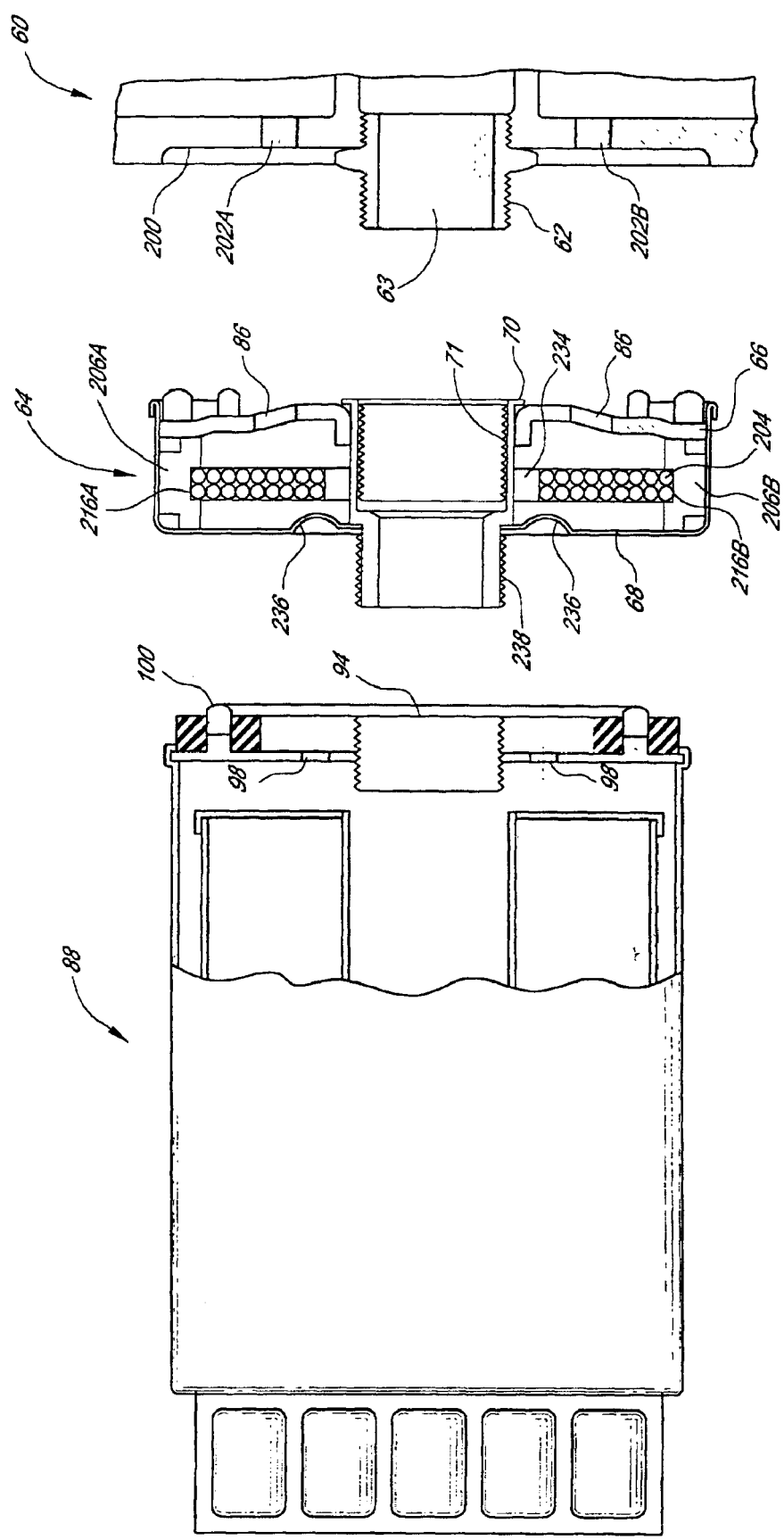
FIG. 2 is a cross-sectional side view of the assembly orientation of the components of FIG. 1.

FIG. 2 illustrates a cross-sectional side view of the assembly components of FIG. 1. Referring now to FIG. 2, a lower sealing surface 200 of the engine block 60 is shown comprising multiple openings 202A, B whereby oil flows through from the engine block 60 to the apertures 86A–F in the upper portion 66 of the magnetic adapter 64.

As shown in FIG. 2, the perforated upper portion 66 has a central opening of a first diameter, and the perforated lower portion 68 has a central opening of a second diameter that is smaller than the first diameter. The removable hollow insert 70 is mounted inside the central openings and extends through the perforated upper portion 66 and the perforated lower portion 68 and provides a first threaded portion adapted to engage the opening 94 of the filter 88. The first threaded portion has an outer diameter that is smaller than the first diameter and larger than the second diameter, and the second threaded portion has an outer diameter that is smaller than the second diameter. The first threaded portion is received within the central opening of the perforated upper portion 66 and the second threaded portion is received within the central opening of the lower perforated portion 68.

A magnetic ring 204 is positioned between the upper portion 66 and the lower portion 68 of the magnetic adapter 64 in the chamber formed by the upper portion 66 and the lower portion 68, and the magnet is held in place by three magnet holders (only two are shown) 206A, and 206B. The magnet holders 206A, 206B are located along the inner periphery of the lower portion 68 and hold the magnetic ring 204 in place with notches 216A, 216B adapted to reversibly engage proper to the thickness of the magnetic ring 204.

Of course it should be realized that any number or shape of magnet holders 206 can be used in any configuration, such as a ring support, so as to support the magnet 204 in an effective orientation in the magnetic adapter housing 65.

The magnet holders 206 have dimensions so as to hold the magnet 204 in the adapter 64 such that a gap is present between the upper portion 66 and the magnet 204. In addition, a gap is preferably present between the magnet 204 and the lower portion 68 of the adapter 64. The size of these gaps can effect the oil velocity through the adapter 64 whereby in the event the gaps are too small the oil velocity may increase and the effectiveness of the magnetic adapter 64 may therefore decrease. However, it will be appreciated that the size of the gaps can be altered to adapt the velocity of a fluid passing through the filter adapter 64.

An opening 234 is located in the center of the magnetic ring 204 so as to allow oil to flow between the magnetic ring 204 and the attachment insert 70. Unfiltered oil flows from the apertures 86A–F in the upper portion 66 of the magnetic adapter housing 65, over and around the magnetic ring 204 such that the oil is confined within the effective range of the magnet 204 by the walls of the canister 68 and the attachment insert 70. The oil then continues to flow to a plurality of fluid flow apertures 236 in the lower portion 68 of the magnetic adapter 64.

As shown, the attachment insert 70 can be slidably engaged with the magnetic adapter 64 through a central opening that passes through the upper portion 66 and the lower portion 68. The design of the adapter 64 is thus flexible in that a plurality of different attachment inserts can be placed within the adapter. Each different attachment insert can be provided with a different dimension threaded interior 71 in order to mount with various threaded studs 62. Similarly, the various attachment inserts can be provided with various external threaded portions 238 in order to mount to a variety of oil filter cartridges 88.

Figure 3:
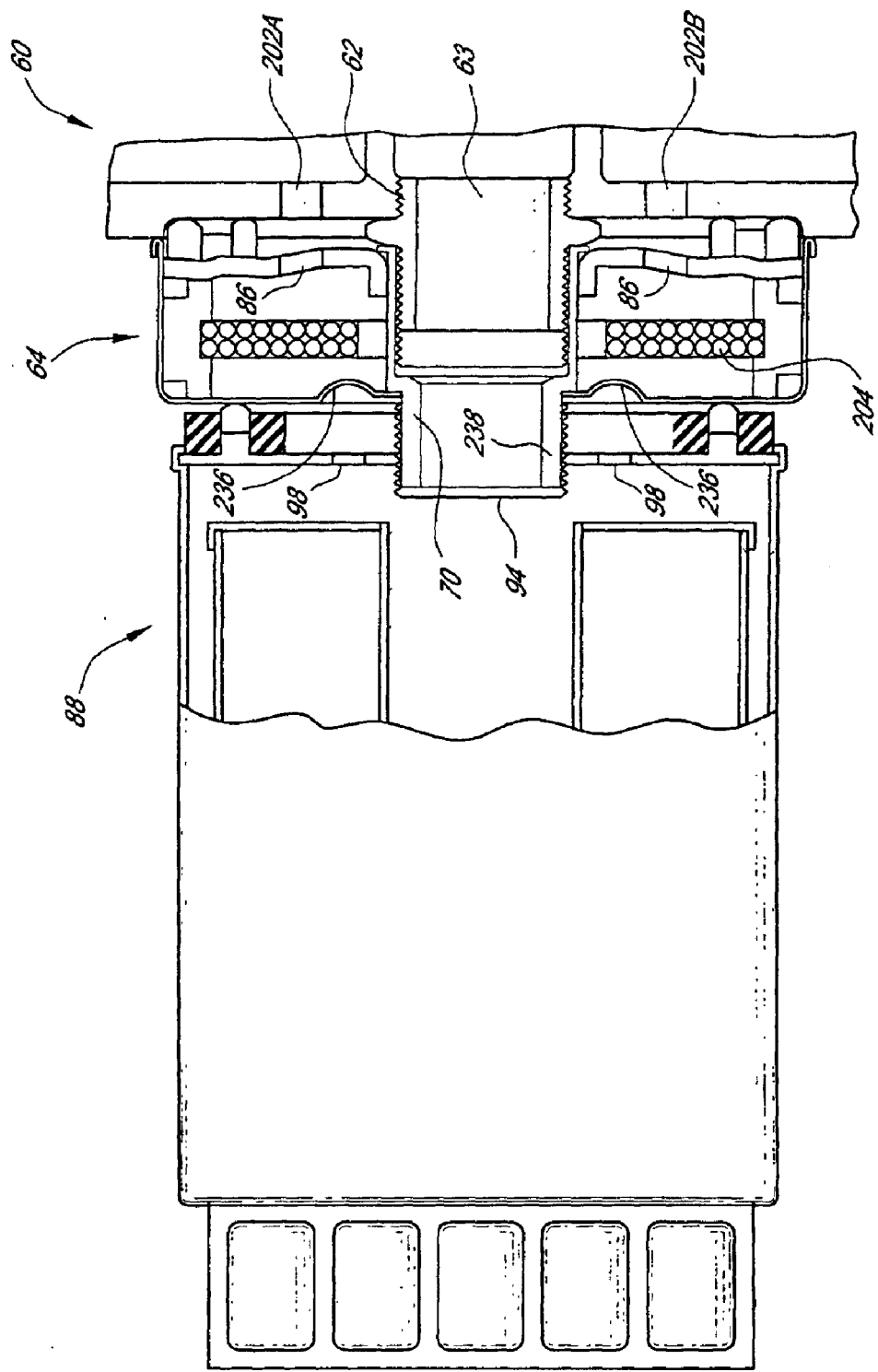
FIG. 3 is a cross-sectional side view of the assembled components of FIG. 2.

FIG. 3 illustrates a cross-sectional view of the assembled components of FIG. 2. In use, the magnetic adapter 64 is threaded onto the cooperating male threaded stud 62 carried by the engine block 60. The filter cartridge 88 is threaded onto the cooperating male exterior threaded portion 238 carried by the attachment insert 70, which is installed in the magnetic adapter 64. Oil flows from the engine block 60, through openings 202 in the sealing surface 200 of the engine block 60, through apertures 86A–F in the upper portion 68 of the magnetic adapter 64, over and around the magnetic ring 204 and through the opening 234 within the effective range of the magnet 204, through the apertures 236 in the lower portion 68 of the magnetic adapter housing 65, and thence through the apertures 98A–F into the filter cartridge 88. After undergoing a filtering process in the filter cartridge 88, the filtered oil proceeds to exit the filter cartridge 88 through the central attaching means 94 and thence through the hollow interior of the attachment insert 70, and back to the engine block 60 through the hollow interior 63 of the threaded stud 62.

The direction of fluid flow through the magnetic adapter 64 is not limited to that exemplified in the figures. The magnetic ring 204 can effectively filter magnetically susceptible particles from the fluid flowing within the effective range of the magnet 204 regardless of the direction of flow. The attachment insert 70 can further assist in modifying the magnetic adapter 64 to an alternate application environment as previously discussed.

Figure 4:
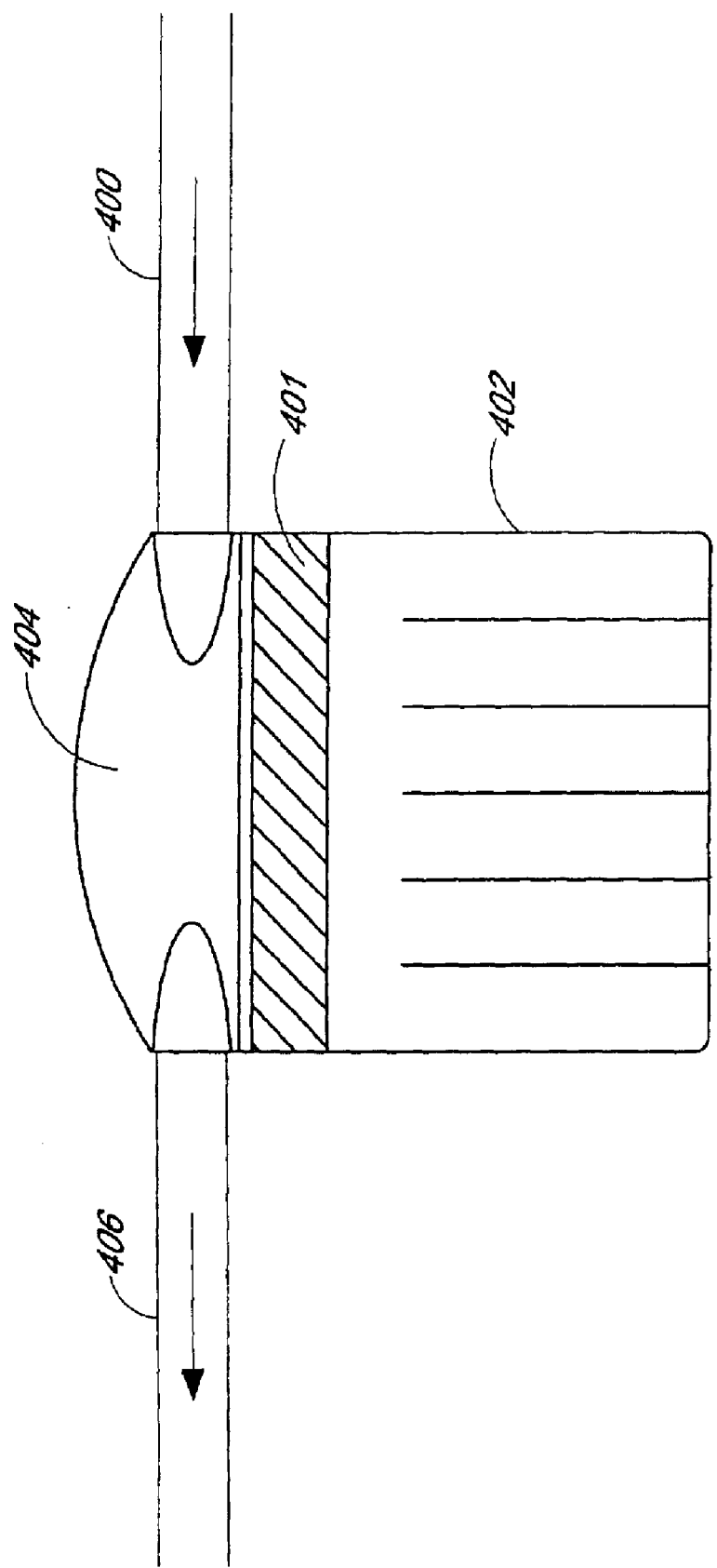
FIG. 4 is an illustration of an additional embodiment of the magnetic adapter.

An additional embodiment of a magnetic adapter 401 is shown in FIG. 4. As illustrated, an inlet fluid flow line 400 is shown providing fluid to a cap 404. The cap 404 is configured to mate with the adapter 401 so that the fluid from the inlet fluid flow line 400 flows through the adapter in the same manner as described above. The fluid then passes through the adapter 401 and into a fluid filter 402. As also illustrated, the cap 404 provides an outlet fluid line 406 which transfers the filtered fluid to its final destination. The fluid flow lines 400 and 406 can be part of, for example, a transmission fluid line, or a hydraulic fluid line.

Figure 5:
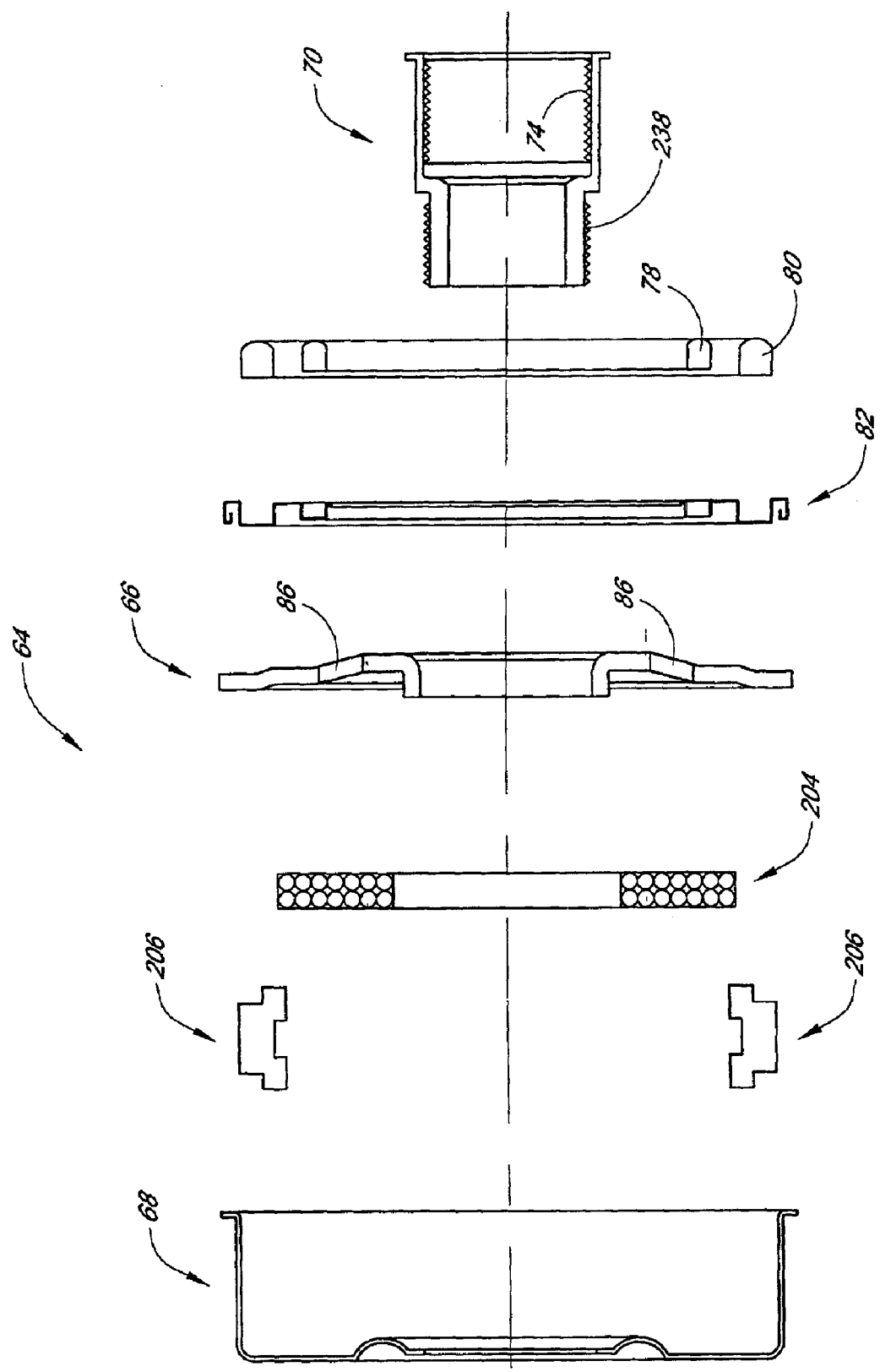
FIG. 5 is a cross-section assembly stack view of the components of a magnetic filter adapter.

FIG. 5 is a cross-section assembly view of the magnetic adapter 64 further illustrating the separated housing components in an assembly stack configuration. The magnetic adapter 64 is assembled by installing the ring supports (again, only two are shown) 206A, 206B, along the outer edge of the magnetic ring 204, and slidably inserting the magnetic ring 204 and ring supports 206A, 206B, into the lower portion 68 of the magnetic adapter 64.

The upper portion 66 of the magnetic adapter 64 is then installed in the lower portion 68 of the magnetic adapter 64 such that the upper portion 66 is supported in position by the ring supports 206A, 206B. The seal carrier 82 can be assembled on the surface of the upper portion 66 by hooking onto a rolled edge of the wall of the lower portion 68. The sealing gaskets 78, 80 can then be mounted in the seal carrier 82, and the attachment insert 70 can be slidably inserted into the body of the magnetic adapter 64. The magnetic adapter 64 and its components can be implemented in shapes other than the circular disc shape illustrated in the figures and described herein so as to effectively filter metallic particles from a fluid.

In an additional embodiment, a magnetic body comprising a plurality of magnet pieces assembled with interleaving steel pole pieces may be installed in place of the magnetic ring 204. Such an embodiment may include modification to the magnet holders, or ring supports and the orientation the magnetic adapter's components. It will also be appreciated that the magnet, or magnetic body, can be magnetized in a plurality of orientations, such as axially, laterally, and radially, and with a plurality of poles. Although the use of different magnetization orientations may alter the position, size, or orientation of the magnetic adapter's components, they are appropriately included in the scope of the invention.

Although a preferred embodiment of the magnetic adapter of the present invention has been discussed in the preceding section, the invention is not limited to this embodiment. Other embodiments which capture the spirit of the invention are also anticipated. The scope of the invention is not limited to the embodiments discussed above, but is only limited by the following claims.

What is claimed is:

1. A magnetic filter adapter for removing magnetically attractable particles from a fluid, comprising:

an adapter body comprising a perforated upper portion and a perforated lower portion, wherein said perforated upper portion and perforated lower portion form a chamber;

a centrally located opening passing through said perforated upper portion, said perforated lower portion, and said chamber;

a removable hollow insert mounted inside said opening, extending through said perforated upper portion, said chamber, and said perforated lower portion, and providing a first threaded portion adapted to engage a threaded stud and a second threaded portion adapted to mount to a filter;

a magnet disposed within said chamber for removing metallic particles from said fluid; and a magnet support for mounting said magnet in said chamber such that gaps for fluid flow exist adjacently between said magnet and said perforated upper portion, adjacently between said magnet and said perforated lower portion, and adjacently between said magnet and said removable hollow insert.

2. The adapter of claim 1, wherein said magnet is in the shape of a ring.

3. The adapter of claim 1, wherein said perforated upper portion comprises at least one sealing gasket.

4. The adapter of claim 1, wherein said perforated upper portion comprises a circular pattern of perforations.

5. The adapter of claim 1, wherein said perforated lower portion comprises a circular pattern of perforations.

6. The adapter of claim 1, wherein said fluid is oil.

7. The adapter of claim 1, wherein said fluid is transmission fluid.

8. The adapter of claim 1, wherein said fluid is hydraulic fluid.

9. The adapter of claim 1, wherein said magnet support comprises a plurality of magnet holders positioned along an inner periphery of said perforated lower portion.

10. An adapter for removing metallic particles from a fluid, comprising:

a cylindrical adapter body comprising a perforated upper portion and a perforated lower portion forming a chamber;

a centrally located opening passing through said perforated upper portion, said perforated lower portion, and said chamber;

a removable hollow insert mounted inside said opening, extending through said perforated upper portion, said chamber, and said perforated lower portion, and providing a first connection means adapted to engage a connection means on a fluid source and a second connection means adapted to mount to a filter;

a magnet disposed within said chamber for removing metallic particles from said fluid; and a magnet support for mounting said magnet in said chamber such that gaps for fluid flow exist adjacently between said magnet and said perforated upper portion, adjacently between said magnet and said perforated lower portion, and adjacently between said magnet and said removable hollow insert, and such that no portion of said magnet contacts said removable hollow insert.

11. The adapter of claim 10, wherein said perforated upper portion comprises at least one sealing gasket.

12. The adapter of claim 10, wherein said perforated upper portion comprises a circular pattern of perforations.

13. The adapter of claim 10, wherein said perforated lower portion comprises a circular pattern of perforations.

14. The adapter of claim 10, wherein said fluid source is an automobile engine.

15. The adapter of claim 10, wherein said magnet is in the shape of a ring.

16. The adapter of claim 10, wherein said magnet support is comprised of three pieces having notches corresponding to the thickness of said magnet.

17. A method of assembly of an adapter for removing metallic particles from a fluid, comprising:

installing a magnet holder on a magnet;

inserting said magnet holder and said magnet in a perforated lower portion of a housing of said adapter;

enclosing said magnet in said adapter by attaching a perforated upper portion of a housing of said adapter to said perforated lower portion, wherein said magnet holder and said magnet are located in a chamber formed by said perforated upper portion and said perforated lower portion such that a gap for fluid flow exists adjacently between said magnet and said perforated upper portion and adjacently between said magnet and said perforated lower portion; and inserting a hollow insert in a centrally located opening passing through said perforated upper portion, said perforated lower portion, and said chamber, such that a gap for fluid flow exists adjacently between said magnet and said hollow insert and such that no portion of such magnet contacts said hollow insert.

18. The method of claim 17, further comprising attaching a sealing gasket to said perforated upper portion.

19. A magnetic filter adapter for removing magnetically attractable particles from a fluid, comprising:

an adapter body comprising a perforated upper portion having a central opening of a first diameter, and a perforated lower portion having a central opening of a second diameter that is smaller than said first diameter;

a removable hollow insert mounted inside said central openings, extending through said perforated upper portion and said perforated lower portion, and providing a first threaded portion adapted to engage a threaded stud and a second threaded portion adapted to mount to a filter, wherein said first threaded portion has an outer diameter that is smaller that said first diameter and larger than said second diameter, wherein said second threaded portion has an outer diameter that is smaller than said second diameter, and wherein said first threaded portion is received within the central opening of the perforated upper portion and said second threaded portion is received within the central opening of the lower perforated portion; and a magnet disposed within said adapter body for removing metallic particles from said fluid.

20. The adapter of claim 19, wherein said magnet is in the shape of a ring.

21. The adapter of claim 20, comprising a ring support for mounting said magnet to said adapter body such that a gap exists between said magnet and said perforated upper portion.

22. The adapter of claim 21, wherein said ring support comprises a plurality of magnet holders positioned along an inner periphery of said perforated lower portion.

23. The adapter of claim 19, wherein said upper portion comprises at least one sealing gasket.

24. The adapter of claim 19, wherein said perforated upper portion comprises a circular pattern of perforations.

25. The adapter of claim 19, wherein said perforated lower portion comprises a circular pattern of perforations.

* * * * *